US009159090B2

(12) United States Patent  (10) Patent No.: US 9,159,090 B2
Ozonat et al.  (45) Date of Patent: Oct. 13, 2015

(54) BUILDING A STANDARDIZED WEB FORM (75) Inventors: Mehmet Kivanc Ozonat, Mountain View, CA (US); Donald E. Young, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1649 days.

(21) Appl. No.: 12/409,555

(22) Filed: Jun. 9, 2009

(65) Prior Publication Data
US 2010/0313111 A1  Dec. 9, 2010

(51) Int. Cl.
G06F 17/00 (2006.01)
G06Q 30/06 (2012.01)

(52) U.S. Cl.
CPC ...................... G06Q 30/06 (2013.01)

(58) Field of Classification Search
CPC .... G06F 17/243; H04M 15/49; G06Q 50/188
USPC .......................................... 715/222, 223, 224
See application file for complete search history.

(56) References Cited

U.S. PATENT DOCUMENTS

| | | | |
|---|---|---|---|
| 5,222,236 A * | 6/1993 | Potash et al. ........................... 1/1 |
| 7,496,184 B2 * | 2/2009 | Oborn et al. ............. 379/114.06 |
| 7,610,278 B2 * | 10/2009 | Su et al. .................................. 1/1 |
| 7,761,787 B2 * | 7/2010 | Singleton et al. ............. 715/243 |
| 8,429,527 B1 * | 4/2013 | Arbogast ....................... 715/255 |
| 2002/0077970 A1 * | 6/2002 | Lebda et al. ..................... 705/38 |
| 2002/0103748 A1 * | 8/2002 | Abhyanker et al. ............. 705/38 |
| 2003/0035133 A1 * | 2/2003 | Berkema et al. ............. 358/1.15 |
| 2005/0190901 A1 * | 9/2005 | Oborn et al. ............. 379/114.02 |
| 2006/0235742 A1 * | 10/2006 | Castellanos et al. ............ 705/10 |
| 2007/0038684 A1 * | 2/2007 | Degtyar ........................ 707/203 |
| 2007/0185883 A1 * | 8/2007 | Naick et al. ...................... 707/10 |
| 2008/0072133 A1 * | 3/2008 | Eckelman et al. ............. 715/224 |
| 2008/0147441 A1 * | 6/2008 | Kil ..................................... 705/2 |
| 2008/0172598 A1 * | 7/2008 | Jacobsen et al. ............. 715/224 |
| 2008/0267505 A1 * | 10/2008 | Dabet et al. .................... 382/181 |
| 2009/0106296 A1 * | 4/2009 | Sickmiller et al. ............ 707/102 |
| 2010/0161460 A1 * | 6/2010 | Vroom et al. ................... 705/31 |
| 2010/0313111 A1 * | 12/2010 | Ozonat et al. ................. 715/222 |

OTHER PUBLICATIONS

2insure4less "Compare Online Insurance Quotes", Jul. 31, 2008 http://www.2insure4less.com.*
2insure4less "Compare Online Insurance Quotes", Jul. 31, 2008, http://www.2insure4less.com.*
Adobe Forum "Linking Multiple Forms", Oct. 25, 2008, http://forums.adobe.com/message/1098055.*
"4freequotes.com", insurance-quotes-review.toptenreviews.com, Feb. 21, 2009, pp. 1-2 http://web.archive.org/web/20090221152819/http://insurance-quote-review.toptenreviews.com/4freequotes-com-review.html.*
Investopedia.com, Statistics, Jan. 7, 2009, pp. 1-2 http://www.investopedia.com/terms/s/statistics.asp.*

* cited by examiner

Primary Examiner — Kyle Stork
Assistant Examiner — Mario M Velez-Lopez
(74) Attorney, Agent, or Firm — Hewlett-Packard Patent Department (57) ABSTRACT One embodiment is a method that builds a standardized web form that includes information extracted from multiple web forms retrieved over a web from different service providers. The standardized web form is used to retrieve price quotes from the different service providers.

19 Claims, 6 Drawing Sheets

\* Required Fields ← 310

Contact Information  /— 320  /— 300

\* Name

\* Phone

\* Fax

\* Email

Job Information

\* Job Name (please be specific)

\* Description

\* Quote Due Date

\* Delivery Due Date

Prepress

| | |
|---|---|
| Art Format | File Supplied |
| Platform | Macintosh |
| Application | QuarkXpress |
| Scans | No    Number of Scans |
| Proof | none |

Press

| | |
|---|---|
| Quantities | * |
| Flat Size | x |
| Folded Size | x |
| Finished Size | x |
| Number of Pages | |
| Cover | No Cover |
| Overs | |

Paper

| | Pages | Type | Grade | Weight | Specific Stock | Recycled |
|---|---|---|---|---|---|---|
| Text | | none | none | none | | ☐ |
| Cover | | none | none | none | | ☐ |
| Additional 1 | | none | none | none | | ☐ |
| Additional 2 | | none | none | none | | ☐ |

FIG. 3A

| | | | | | | 300 |
|---|---|---|---|---|---|---|
| Stock Supplied by: | Printer | | | | | |
| Alternate Stock OK: | Yes | | | | | |

Inks

| Text | Colors | Varnish | Aqueous | Specialty Inks | Bleeds |
|---|---|---|---|---|---|
| Side 1 | 4c process | none | none | none | ☐ |
| Side 2 | 4c process | none | none | none | ☐ |
| Cover | Colors | Varnish | Aqueous | Special Inks | Bleeds |
| Side 1 | 4c process | none | none | none | ☐ |
| Side 2 | 4c process | none | none | none | ☐ |
| Additional | Colors | Varnish | Aqueous | Special Inks | Bleeds |
| Side 1 | 4c process | none | none | none | ☐ |
| Side 2 | 4c process | none | none | none | ☐ |
| Additional 2 | Colors | Varnish | Aqueous | Special Inks | Bleeds |
| Side 1 | 4c process | none | none | none | ☐ |
| Side 2 | 4c process | none | none | none | ☐ |

Finishing

| | | | | | |
|---|---|---|---|---|---|
| Scoring | no | Score: | none | No. of Scores: | ☐ |
| Drilling | no | No. of Holes: | ☐ | Hole Diameter | ☐ |
| Foil Stamping | no | Stamping: | none | Additional Info: | ☐ |
| Folding | no | Fold: | none | No. of Folds: | ☐ |
| Die Cutting | no | Die Cut: | None | Die Cut Size: | ☐ |
| Perforation | no | Perf: | None | No. of Perfs: | ☐ |
| Binding | no | Type of Bind: | None | Length of Bind Edge: | ☐ |
| Padding | no | No. per Pad: | ☐ | | |
| UV Coating | none | | | | |
| Lamination | no | | | | |

Packaging

| | | | |
|---|---|---|---|
| Packing | none | Special Instructions | ☐ |
| Cartons | none | Special Instructions | ☐ |
| Skids | no | Special Instructions | ☐ |

Delivery

| | |
|---|---|
| Delivery Terms | none |
| Delivery Method | none |

FIG. 3B

| Specific Carrier | ☐ |
| Carrier Phone: | ☐ |
| Delivery Address | ☐ |
| Company | ☐ |
| Address | ☐ |
| City | ☐ |
| State | ☐ |
| Zip | ☐ |
| Attn | ☐ |
| Phone | ☐ |

300

Comments

330

Submit Request

FIG. 4

BUILDING A STANDARDIZED WEB FORM

CROSS-REFERENCE TO RELATED APPLICATIONS

This application relates to the following patent applications which are filed concurrently herewith and incorporated herein by reference: U.S. patent application Ser. No. 12/409,550 filed Mar. 24, 2009 entitled "Populating a Service Registry with Web Content" and U.S. patent application Ser. No. 12/409,561 filed Mar. 24, 2009 entitled "Transforming a Description of Services for Web Services."

BACKGROUND

Service providers are businesses that provide subscription or web services to other businesses and individuals. Typically, service providers have a presence on the World Wide Web (web) through which they describe and offer their services. Users can navigate through web pages to obtain information about services being offered.

Many service providers provide customers with web-based requirements forms through which the customers can get price quotes for available services. The customer fills out the requirements form to specify requirements of desired services. For instance, a typical poster printing service provider would ask its customer to input requirements such as background color, ink type, size, and turnaround time for the poster to be printed. In response to the requirements input by the customer, the service provider returns the customer a price quote.

In order to receive multiple quotes, the customer fills out a different form at each web site of the service providers. Filling out forms at each site is time-consuming. This often limits the customer to visiting only a few sites and comparing a few prices.

DETAILED DESCRIPTION

Exemplary embodiments in accordance with the invention include apparatus, systems, and methods that generate forms and questions to create service templates for customers desiring services of online service providers. A standardized web form is built from plural web forms retrieved from web sites of service providers. Customers fill out a single standardized form to receive quotes for services from multiple different service providers.

Exemplary embodiments enable customers to compare among a large selection of service providers before purchasing a service without the need to undergo the time-consuming and ineffective task of filling out separate requirements forms for each service provider. Customers carry out complex business tasks (e.g., a marketing executive running a telemarketing campaign) through utilizing online service providers without filling out a different form for each service provider. Instead, customers complete a single, standardized form to obtain multiple price quotes for different service providers. Such a standardization of requirements forms allows for the creation of reliable rating and reputation systems to assess service providers. This standardization enables customers to make a fair comparison among service providers.

Prior to purchasing and using a web service provider, a user or customer provides a description on a single form of the desired services. This description enables multiple different service providers to customize the service for the customer and provide a price quote to the customer. The customer is able to compare prices and services offered by the different service providers so the customer can select the best service provider for the desired services.

Exemplary embodiments in accordance with the invention provide a machine learning approach to discover classes of service providers with similar requirements and provide a common requirements form for service providers with similar requirements. This helps the customer to fill out a single form for multiple service providers. The standardization (of requirements) leads to reliable rating and trust/reputation systems to assess service providers because, with the standardization, users can make fair comparisons among the different service providers with similar requirements.

By way of example, one embodiment uses statistical classification to generate the common requirements forms for services with similar requirements. The similar requirements are obtained by comparing the individual requirements of web forms for different service providers. An expectation-maximization (EM) algorithm with constraints is employed. The constraints represent the requests from the customers (e.g., "printing a color poster") input to the services marketplace website. The hidden variables are the service types (e.g., poster printing service), and the observations are the web-based requirements forms of the service providers. The EM algorithm can include hard constraints and soft constraints. One embodiment uses soft constraints to encourage the web forms retrieved in response to similar requests to be clustered into a same service type. The derivation also introduces a set of variables (in addition to the hidden variables) to help avoid the need to use natural language pre-processing techniques.

Figure 1:
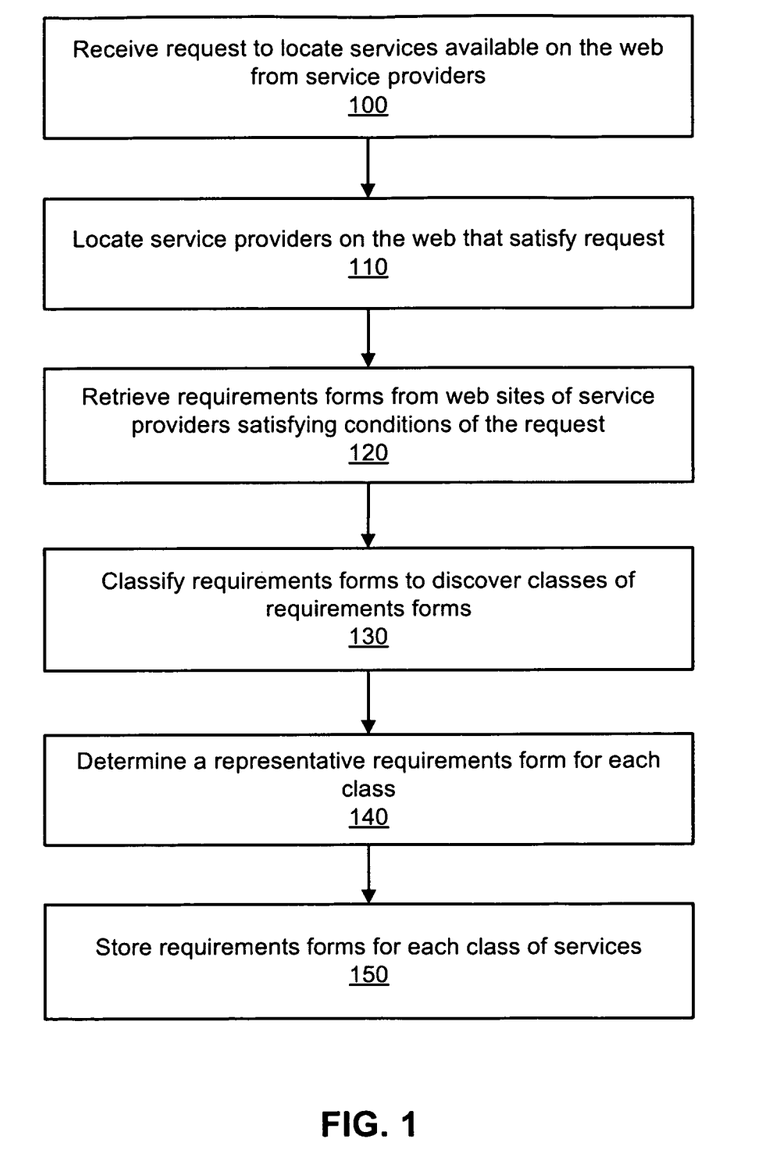
FIG. 1 is a flow diagram of a method for developing single web forms that represent multiple web forms from different service providers in accordance with an exemplary embodiment of the invention.

FIG. 1 is a flow diagram of a method for developing single web forms that represent multiple web forms from different service providers in accordance with an exemplary embodiment of the invention.

According to block 100, a request is received or processed to locate services available on the web from service providers. For example, a customer or user desires to purchase services from an online service provider. A request is made for these services. The request includes a written description of the web services desired by the customer. For instance, one such request might be "printing a color poster for an advertisement campaign."

In order to generate a generic or standardized form, we begin with a training set of N samples, where each sample i, $1 \leq i \leq N$, consists of a pair: a request and a requirement form. By request, we imply the request by a customer willing to purchase a service.

According to block 110, service providers that satisfy the request are located on the web. For example, a query (i.e., the written request describing the services) is provided to a search engine, such as GOOGLE or ALTA VISTA.

According to block 120, the requirement forms or web forms are retrieved from web sites of service providers that satisfy conditions of the request. For example, if the request were "printing a color poster for an advertisement campaign" the search engine would locate service providers that provide these printing services and locate corresponding forms for these printing services on the web sites. A search engine is used for retrieving the forms. Further, such forms are retrieved from many web sites of different service providers.

A requirements form typically includes information that the requester (for example, customer or user) inputs in order to receive a price quote. For instance, the requirements forms retrieved in response to the request "printing a color poster for an advertisement campaign" might include entries such as color, ink type, size, number of copies, and turnaround time for the poster.

According to block 130, the requirements forms are classified to discover classes of requirements forms. The retrieved forms are associated or categorized with a particular class or group of web forms. Service providers in a same class offer similar, common, or same web services. For example, the retrieved web forms might be associated with a class of printing services, telemarketing services, copyright services, legal services, etc.

According to block 140, a representative requirements form is determined for each class and a standardized web form is built or generated for each class. In other words, for each class of web forms retrieved from the web sites of the service providers, a single web form is generated that represents a standardized web form for all of the retrieved forms in the class.

In response to each request, M requirement forms are retrieved by the search engine, where M is a pre-defined integer. We treat each of the M forms as a separate sample. Thus, if there are D distinct requests in the training set, then N=D×M. One goal is to classify requirements forms, i.e., to discover classes of requirements forms and to have a representative requirements form for each class.

According to block 150, the requirements forms for each class of services are stored. The number of stored forms depends on the number of classes. For example, a standardized form exists for each of the following exemplary classes: printing services, lead generation services, copyright litigation, web hosting services, telemarketing services, computer technical support services, etc.

The amount of pairwise similarity between any two requests is quantified based on natural language processing techniques. An immediate approach to classify requirement forms is to model the classification problem as a constraint classification (with pairwise constraints) problem such that the feature vectors are the requirement forms, the constraints are the requests from the customers, and the (hidden) class variables are the requirement form classes. Denoting by $x_i$ the requirement form, by $r_i$ the request, and by $s^i$ the requirement class of the $i^{th}$ training sample, the likelihood is given by the following equation:

$$L(\theta) = \log f(X \mid R) \quad (1)$$
$$= \sum_i \log \sum_{S_i} f_{X|S}(x_i \mid s_i) + \log p_{S|R}(s \mid R).$$

Here, X, R and S are defined over a common probability space with $x_i$, $r_i$ and $s_i$ drawn from X, R and S, respectively; $f_{X|S}$ is the conditional pdf of X given S; and $P_{S|R}$ is the conditional pmf of S given R. $P(.|R)$ is constructed so that, when $s_i = s_j$, $P(s|R)$ increases with the distance between $r_i$ and $r_j$.

Maximizing (1) is performed within an expectation-maximization (EM) framework with soft constraints, bearing in mind that the pairwise constraints cause the expectation steps of the EM solutions to the problem formulated in 1 to be sub-optimal.

We note, however, that the accuracy of the constraint classification framework, with likelihood as given in (1), depends on the existence of a powerful natural language pre-processing step. Often, requests with no or only a few words in common between them may have similar meanings, and requests with many common words in between them may have very different meanings. For instance, the request "printing a color poster for a marketing campaign" and the request "red and blue banner for advertising our business" both imply that the customer needs to print a colored poster to be used in an advertisement campaign. In such cases, natural language pre-processing is ensures that $P(s_i = s_j | R)$ is large if the requests $r_i$ and $r_j$ have similar meanings, and $P(s_i = s_j | R)$ is small if the requests $r_i$ and $r_j$ have different meanings. Unfortunately, it is a very challenging task to design such powerful natural language processing algorithms.

We provide an approach that addresses the aforementioned problem through the introduction of a variable $C \in 1, 2, \ldots, M$ that may be viewed as playing the role of clustering requests, R. Our likelihood function is shown at the following equation:

$$L(\theta) = \log f(X, C \mid R; \theta_1, \theta_2) \quad (2)$$
$$= \log \sum_S p(X \mid S; \theta) p(S \mid C; \theta) p(C \mid R; \theta)$$
$$= \sum_i \log \sum_{S_i} [f_{X|S}(x_i \mid s_i; \theta) p(s_i \mid c_i; \theta)] + \log p(C \mid R; \theta)$$

The introduction of the variable C allows for a simple model that uses natural language processing to construct the conditional distribution of C given R from the pairwise constraints between requests. In particular, we let the conditional probability be shown below:

$$P(C \mid R) \alpha \sum_{i=1} \sum_{i=1} w_{i,j} (c_i - c_j)^2, \quad (3)$$

where $w_{i,j}$ indicates the amount of preference for request i and j to belong to the same request cluster. Thus, $w_{i,j}$ is large if the preference is high, and $w_{i,j}$ is low if the preference is low. Specifically, $w_{i,j}$ is set to the following:

$w_{i,j}$ = (number of words common to $r_i$ and $r_j$)/(number of words in $r_i$ × number of words in $r_j$) (4)

Thus, typically, the amount of preference is high when there are many common words between $r_i$ and $r_j$, and the amount of preference is low if there are no or only a few common words between $r_i$ and $r_j$.

We notice that the simple weight scheme of equation (4) is likely to fail under the formulation in equation (1), but it works satisfactorily under the formulation in equation (2). To illustrate, we compare the two formulations, with $w_{i,j}$ as given in equation (4), using the following four cases:

(1) f and g two groups of requests with similar meanings and with many common words between the two groups: Both formulations will encourage the requests in f and g to be in the same class.

(2) f and g are two groups of requests with similar meanings and with few or no common words between the two groups (e.g., they may be synonyms): Only the formulation in (2) will encourage $s_i$ and $s_j$ to be in the same class.

(3) f and g are two groups of requests with different meanings and with few or no common words between the two groups: Both formulations will encourage $s_i$ and $s_j$ to be in different classes.

(4) f and g are two groups of requests with different meanings and with many common words between the two groups (e.g., words such as "and", "the", etc.): Only the formulation in (2) will encourage si and $s_j$ to be in the same class.

We maximize the likelihood given in equation (2) through a generalized EM (GEM) framework. The likelihood function in equation (2) is expressed as follows:

$$L(\theta) = \sum_i \log \sum_{s_i} [f_{x|s}(x_i \mid s_i; \theta) p(s_i \mid c_i; \theta)] + \log p(C \mid R; \theta) \quad (5)$$

$$= \sum_i \log \sum_{s_i} Q_i(s_i) [fx \mid s(x_i \mid s_i; \theta) p(s_i \mid c_i; \theta)] / Q_i(s_i) +$$

$$\log p(C \mid R; \theta)$$

where $Q_i(s_i)$ is a probability mass function (pmf) over $s_i$.

The E-step of the EM algorithm is then $$Q_i(s^i) = p(s_i \mid x_i, c_i; \theta) \quad (6)$$

$$= p(x_i \mid s^i; \theta) p(s^i \mid c_i; \theta) \Big/ \sum_{s^i} p(x^i \mid s^i; \theta) p(s^i \mid c_i; \theta)$$

The parameters, $\mu_k$, $\Sigma_k$ and $p_k$ can be shown to be maximized as $$\mu_k = \sum_i p(s_i = k \mid x_i, c_i; \theta) x_i \Big/ \sum_i p(s_i = k \mid x_i, c_i; \theta). \quad (7)$$

$$\sum_k = \quad (8)$$

$$\sum_i p(s_i = k \mid x_i, c_i; \theta)(x_i - \mu_k)(x_i - \mu_k)^T \Big/ \sum_i p(s_i = k \mid x_i, c_i; \theta).$$

$$p(s = k \mid c = j) = 1 / N_j \sum_{c_i = j} p(s_i = k \mid x_i, c_i; \theta), \quad (9)$$

where $N_j$ denotes the number of training samples i with $c_i=j$.

Finally, we maximize $$\sum_i \sum_{s_i} \log Q_i(s_i) p(s_i \mid c_i; \theta) + \log p(C \mid R; \theta) \quad (10)$$

through an iterative scheme by setting, for each i from 1 to N, $$c_i = \operatorname{argmax}_j \log p(s_i | c_i = j) + P(C); \quad (11)$$

where $c_i$ is the request cluster to which the $i^{th}$ request is mapped.

To show that the algorithm converges, we let $\theta^{(t)}$ and $\theta^{(t+1)}$ be the parameters from two successive iterations of algorithm. We can show that $I(\theta^{(t)}) \leq I(\theta^{(t+1)})$, i.e., the algorithm monotonically improves the log-likelihood and hence, converges to a local maximum, as shown below:

$$\ell(\theta^{(t+1)}) \geq \sum_i \sum_{s(i)} Q_i^{(t)}(s_{(i)}) \ln p(x_{(i)}, s_{(i)|ci}; \theta^{(t+1)}) / Q_i^{(t)}(s_{(i)}) + \quad (12)$$

$$\log P(C \mid R; \theta^{t+1})$$

$$\geq \sum_i \sum_{s(i)} Q_i^{(t)}(s_{(i)}) \ln p(x_{(i)}, s_{(i)|ci}; \theta^{(t+1)}) / Q_i^{(t)}(s_{(i)}) + \quad (13)$$

$$\log P(C \mid R; \theta^t)$$

$$\geq \sum_i \sum_{s(i)} Q_i^{(t)}(s_{(i)}) \ln p(x_{(i)}, s_{(i)|ci}; \theta^{(t)}) / Q_i^{(t)}(s_{(i)}) + \quad (14)$$

$$\log P(C \mid R; \theta^t) \quad (15)$$

$$= \ell(\theta^{(t)})$$

where (12) follows from the Jensen's inequality and (6); (13) follows from the maximization in (7) through (9); (14) follows from (11); and (15) follows from the definition of likelihood in (5).

In one exemplary embodiment, the training algorithm is iterative and includes the following steps:
  (i) Initialize the parameters $\mu_k$, $\Sigma_k$ and $p_k$, and set t=1.
  (ii) E-step: For each i, set $Q_i(s_i)$ according to (6).
  (iii) M-step: For each k, set $\mu_k$, $\Sigma k$ and $p_k$ according to (7), (8) and (9), respectively.
  (iv) M-step: For each i, set $c_i$ according to (11).
    a. Stop if the ratio of decrease from (15) and (12) is less than a pre-defined. Otherwise, set t=t+1, and return to step (ii).

Figure 2:
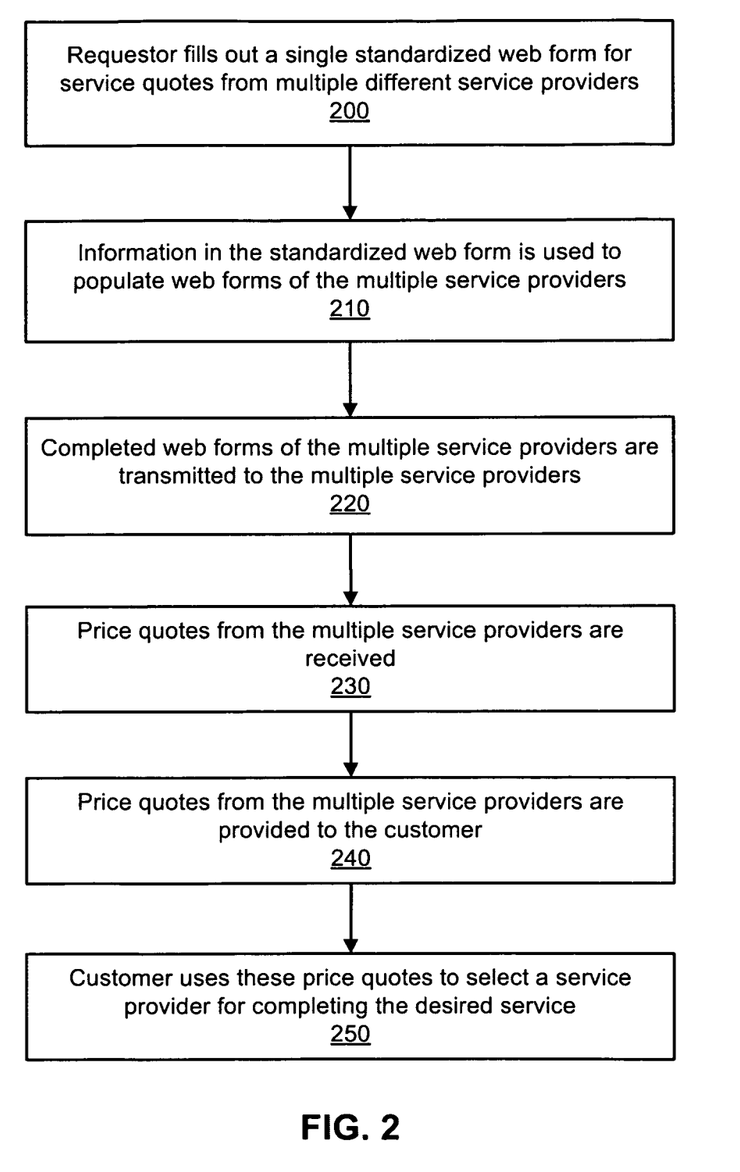
FIG. 2 is a flow diagram of a method for providing a customer with plural service quotes from multiple service providers upon completing a single standardized web form in accordance with an exemplary embodiment of the invention.

FIG. 2 is a flow diagram of a method for providing a customer with plural service quotes from multiple service providers upon completing a single standardized web form in accordance with an exemplary embodiment of the invention.

According to block 200, a requester (such as a user, customer, or computer) fills out a single standardized web form for service quotes from multiple different service providers. For example, if the customer desires price quotes from multiple service providers for printing services, the customer completes a printing service request web form (such as the standardized web form shown in FIGS. 3A-3C). The completed standardized web form is transmitted, uploaded, or provided to a computer for processing.

According to block 210, information in the standardized web form is used to populate web forms of the multiple service providers. The standardized web form includes common requirements of information required on the web forms of the multiple service providers. Information completed on the standardized form is extracted and applied (i.e., used to complete or fill out) to the web forms of the service providers. By filling out a single form, the requester is able to provide sufficient information to complete multiple different forms. Each of the separate web forms of the service providers can have information that is different or unique to that form and information that is common to all of the web forms in the class.

According to block 220, the completed web forms of the multiple service providers are transmitted to the multiple service providers. The service providers then analyze the information on their respective forms and provide a price quote for the customer. In addition to price, the service providers can provide other information, such as alternate options for completing the project, projected time frame for completing the project, break-down of costs for completing the project, etc.

According to block 230, price quotes from multiple service providers are received.

According to block 240, the price quotes from the multiple service providers are provided to the customer.

According to block 250, the customer uses these price quotes to select a service provider for completing the desired service.

Figure 3A:
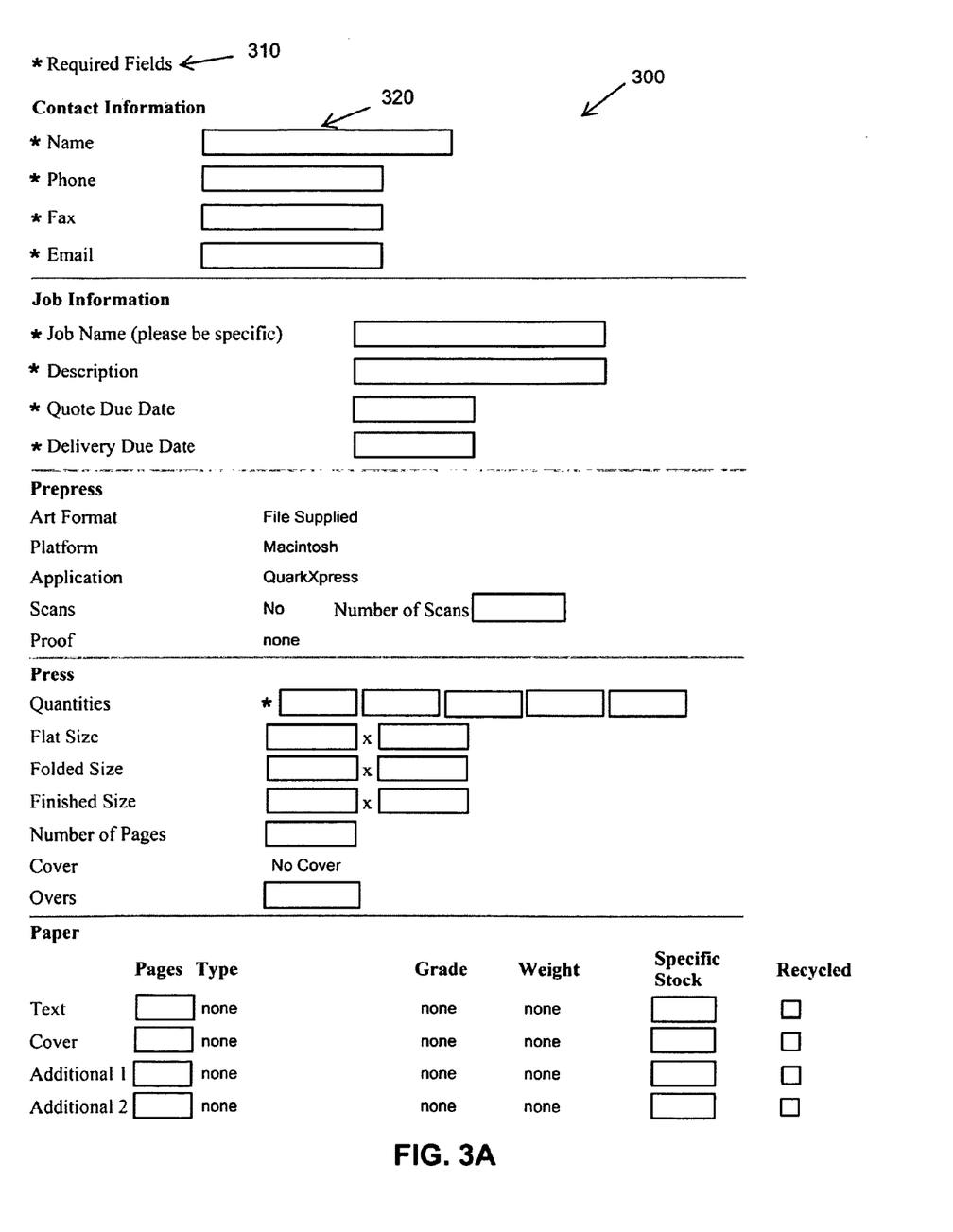
FIG. 3A is a first page of an example standardized web form for printing services in accordance with an exemplary embodiment of the invention.
Figure 3B:
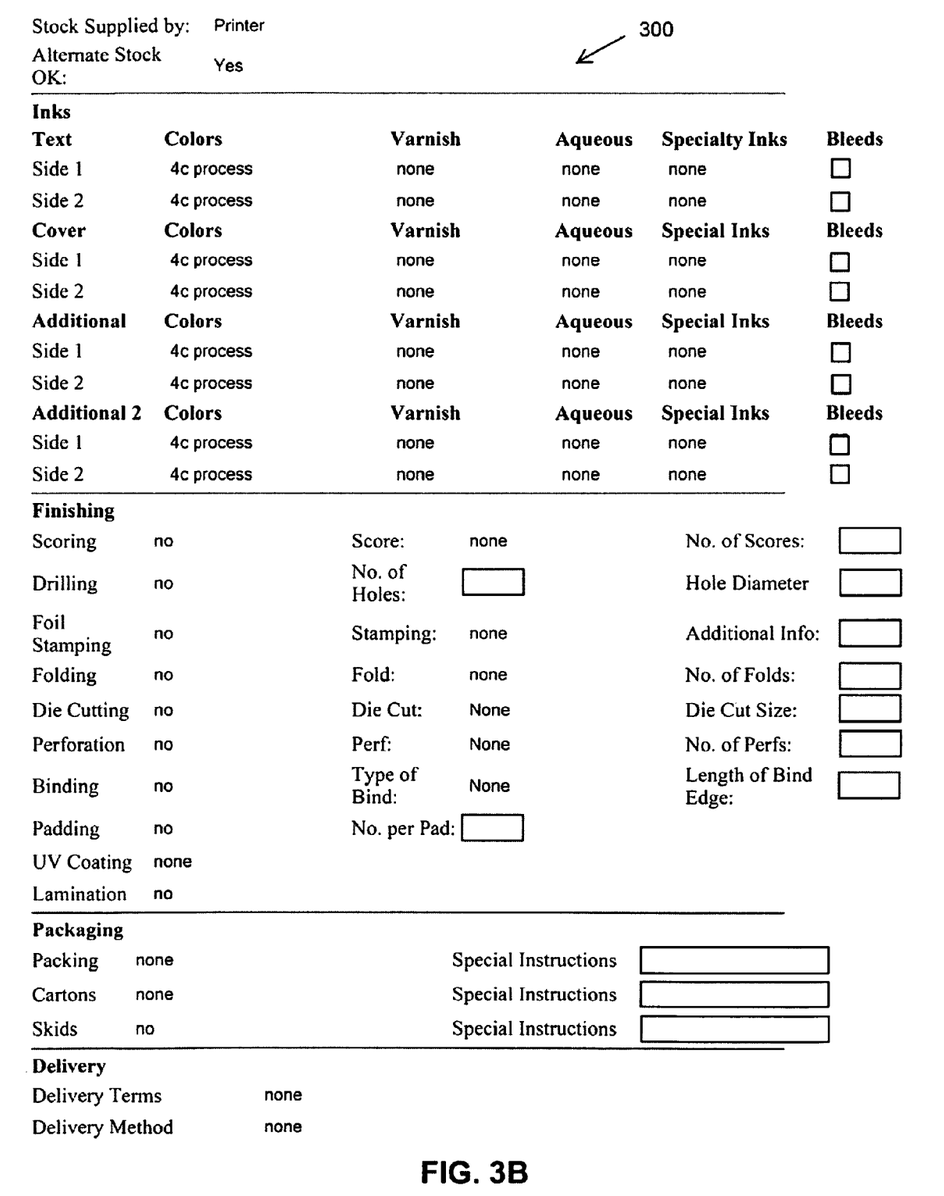
FIG. 3B is a second page of an example standardized web form for printing services in accordance with an exemplary embodiment of the invention.
Figure 3C:
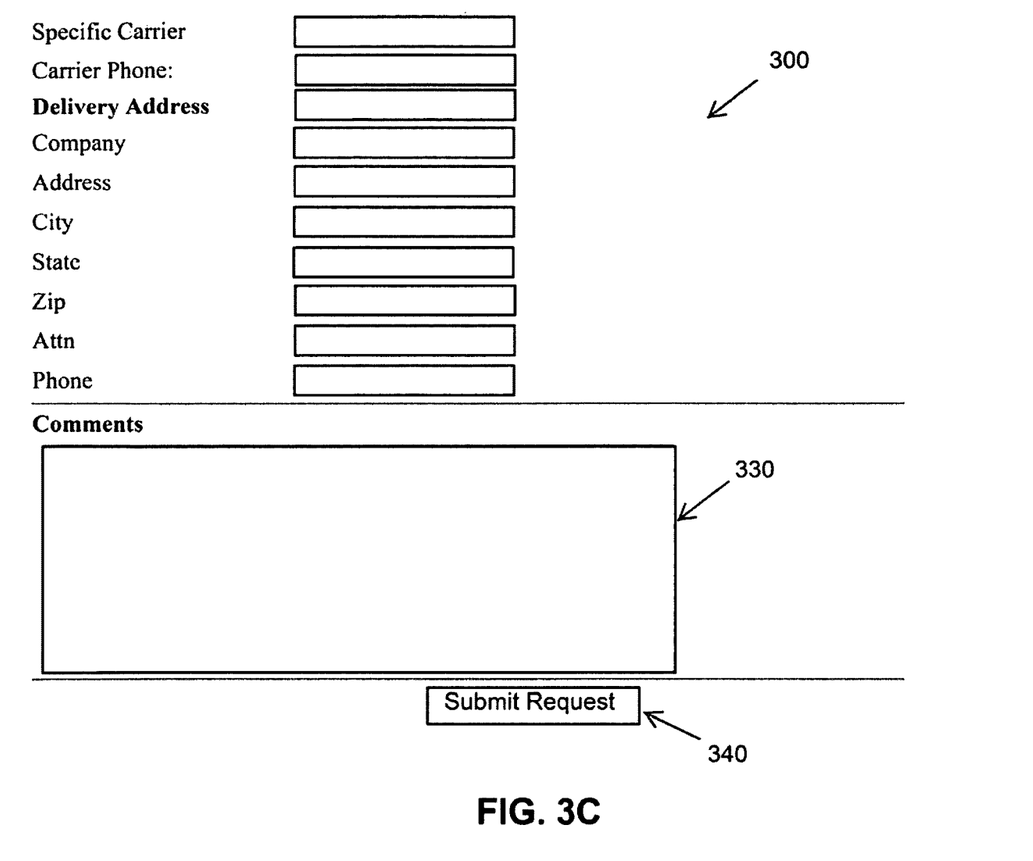
FIG. 3C is a third page of an example standardized web form for printing services in accordance with an exemplary embodiment of the invention.

FIGS. 3A-3C show three pages of an example standardized web form 300 for printing services in accordance with an exemplary embodiment of the invention.

Form 300 includes a plurality of required fields 310 (shown with an asterix) and un-required or non-essential fields. Examples of these fields include the following: contact information, job information, prepress, press, paper, inks, finishing, packaging, and delivery. Each of these fields includes sub-fields or locations for the requester to enter more information in, for example, a text box 320. For example, the field entitled "contact information" includes text boxes for name, phone number, fax number, and email address of the requester. The form also includes a comment box 330 (for example, where the requester can enter specific instructions or comments on the requested service) and a "submit request" button 340 that submits the web form to the various service providers in the class.

Figure 4:
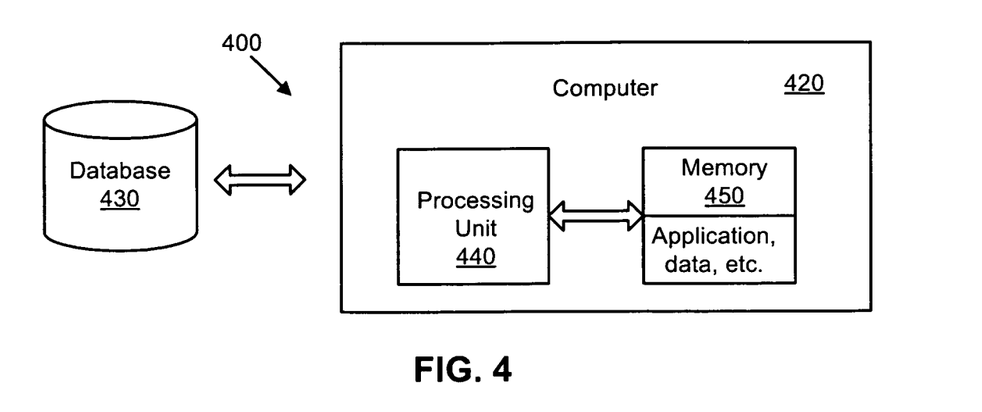
FIG. 4 is a computer system for implementing methods in accordance with an exemplary embodiment of the present invention.

The computer system 400 includes a computer 420 coupled to storage devices 430, such as a database. The computer 420 comprises a processing unit 440 (such as one or more processors of central processing units, CPUs) for controlling the overall operation of memory 450 (such as random access memory (RAM) for temporary data storage and read only memory (ROM) for permanent data storage) and one or more algorithms or programs (such as algorithms and/or programs to implement methods in accordance with exemplary embodiments). The memory 450 stores data, control programs, and other data associate with the computer 420.

Embodiments in accordance with the present invention are not limited to any particular type or number of storage devices and/or computer. The computer system, for example, includes various portable and non-portable computers and/or electronic devices. Exemplary computer include, but are not limited to, servers, main frame computers, distributed computing devices, laptops, and other electronic devices and systems whether such devices and systems are portable or non-portable.

DEFINITIONS

As used herein and in the claims, the following words are defined as follows:

The term "web document" is a Hypertext Markup Language (HTML) page that is accessible over Hypertext Transfer Protocol (HTTP) protocol.

The term "requirements form" or "web form" is a form on a web page that allows a user to enter data that is sent to a server for processing. Web forms resemble paper forms and enable internet users the ability to electronically fill out the forms using, for example, checkboxes, radio buttons, menus, etc. Web forms are used to enter information (such as personal information and product and service request information) to enable users to describe and request services and the service providers to perform the requested service.

A "user" or "requestor" or "customer" is human, entity, machine, computer, or program. In some embodiments, they request, describe, and define the service requirements and ultimately select the service provider.

The term "service provider" is a business or entity that delivers services over the web and describes its service capabilities via web pages.

The term "web" means the World Wide Web.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media, of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   in response to a request for services received from a requestor, retrieving, with a computer, multiple different web firms over a web from a plurality of service providers, wherein each of multiple different web forms is associated with a corresponding service provider of the plurality of service providers;
   building, with the computer, a standardized web form using statistical classification of the multiple different web forms, wherein using the statistical classification of the multiple different web forms comprises using an expectation-maximization algorithm with constraints;

populating, with the computer, the multiple different web forms using information entered into the standardized web form by the requestor;

transmitting, with the computer, the multiple different web forms to the corresponding service providers of the plurality of service providers to obtain price quotes for the services; and providing the price quotes from the plurality of service providers to the requestor.

2. The method of claim 1 further comprising:

receiving a written description of the services from the requestor on the request;

displaying the price quotes to the requestor.

3. The method of claim 1 further comprising:

receiving, in the request, a written description of web services;

providing the written description to a search engine to retrieve service providers that offer web services described in the written description;

extracting the multiple different web forms from web sites of the service providers.

4. The method of claim 1, wherein the multiple different web forms include information that is unique and information that is common to all of the multiple different web forms.

5. A computer, comprising:

a processor to, in response to a request for services, process a description of services included in the request to locate different service providers that provide the services, retrieve a plurality of different web forms over a web from the different service providers, build a standardized web form using statistical classification of the plurality of different web forms retrieved from the different service providers, wherein using the statistical classification of the plurality of different web forms comprises using an expectation-maximization algorithm with constraints, and provide the standardized web form to a customer to complete the standardized web form to receive multiple price quotes from the different service providers.

6. The computer of claim 5, wherein the processor is to transmit the standardized web form to the different service providers.

7. The computer of claim 5, wherein the processor is to cause display of the multiple price quotes to the customer to provide a comparison of different prices from the different service providers.

8. The computer of claim 5, wherein the standardized web form includes a plurality of fields that are filled by the customer to describe desired web services.

9. The computer of claim 5, wherein the processor is to further group the web forms retrieved from the different service providers into a class of service providers that offer common services.

10. A tangible computer readable storage medium having instructions for causing a computer to:

in response to a request for services received from a requestor, retrieve multiple different web forms over a web from different service providers;

build a standardized web form using statistical classification of the multiple different web forms, wherein using the statistical classification of the multiple different web forms comprises using an expectation-maximization algorithm with constraints; and provide the standardized web form to a customer requesting multiple price quotes from the different service providers.

11. The tangible computer readable storage medium of claim 10 wherein the instructions are for causing the computer to further extract customer-entered information from the standardized web form to populate the multiple different web forms of the different service providers.

12. The tangible computer readable storage medium of claim 10 wherein the instructions are for causing the computer to further use a search engine to locate the different service providers on the web.

13. The tangible computer readable storage medium of claim 10 wherein the instructions are for causing the computer to further group the different service providers into a class that offers common services.

14. The tangible computer readable storage medium of claim 10 wherein the instructions are for causing the computer to further transmit the standardized web form to the different service providers to obtain the price quotes.

15. The tangible computer readable storage medium of claim 10, wherein the constraints comprise a plurality of requests for services.

16. The method of claim 1, wherein using the statistical classification of the multiple different web forms comprises using the expectation-maximization algorithm further with hidden variables.

17. The method of claim 16, wherein the constraints comprise the request for services received from the requestor, and the hidden variables comprise different types of requested services.

18. The computer of claim 5, wherein the processor is to use the statistical classification of the plurality of different web forms by using the expectation-maximization algorithm further with hidden variables and observations.

19. The computer of claim 18, wherein the constraints comprise the request for services received from the requestor, the hidden variables comprise different types of requested services, and the observations comprise the plurality of different web forms.

* * * * *

UNITED STATES PATENT AND TRADEMARK OFFICE
CERTIFICATE OF CORRECTION

PATENT NO.        : 9,159,090 B2
APPLICATION NO.   : 12/409555
DATED             : October 13, 2015
INVENTOR(S)       : Mehmet Kivanc Ozonat et al.

Page 1 of 1

It is certified that error appears in the above-identified patent and that said Letters Patent is hereby corrected as shown below:

IN THE CLAIMS:

In column 8, line 59, in Claim 1, delete "firms" and insert -- forms --, therefor.

Signed and Sealed this
Twelfth Day of July, 2016

Michelle K. Lee
*Director of the United States Patent and Trademark Office*